US010037748B2

(12) United States Patent
Shepherd

(10) Patent No.: US 10,037,748 B2
(45) **Date of Patent: *Jul. 31, 2018**

(54) HAMMER VELOCITY MEASUREMENT SYSTEM

(71) Applicant: Steinway, Inc., New York, NY (US)

(72) Inventor: Richard Shepherd, Middlesbrough (GB)

(73) Assignee: Steinway, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/437,789

(22) Filed: Feb. 21, 2017

(65) Prior Publication Data

US 2017/0169805 A1 Jun. 15, 2017

Related U.S. Application Data

(63) Continuation of application No. 14/867,275, filed on Sep. 28, 2015, now Pat. No. 9,620,090.

(30) Foreign Application Priority Data

Oct. 2, 2014 (GB) .................................. 1417448.6

(51) Int. Cl.
*G10H 1/34* (2006.01)
*G10G 3/04* (2006.01)
(Continued)

(52) U.S. Cl.
CPC ................. *G10G 3/04* (2013.01); *G10F 1/02* (2013.01); *G10H 1/14* (2013.01); *G10H 1/344* (2013.01);
(Continued)

(58) Field of Classification Search
CPC ........................................................ G10H 1/34
(Continued)

(56) References Cited

U.S. PATENT DOCUMENTS 4,307,648 A * 12/1981 Stahnke .................. G10G 3/04 84/254
5,107,748 A * 4/1992 Muramatsu .......... G10H 1/0555 341/27
(Continued)

FOREIGN PATENT DOCUMENTS

EP 1 555 651 7/2005

OTHER PUBLICATIONS

Combined Search and Examination Report; GB1417448.6; dated Jan. 13, 2016; 8 pages.
Search Report; GB1417448.6; dated May 17, 2017; 2 pages.

*Primary Examiner* — David Warren
(74) *Attorney, Agent, or Firm* — Fish & Richardson P.C.

(57) ABSTRACT

A system 100, for determining the velocity of a hammer 120 of a keyboard instrument, with a light transceiver 140 and processing circuitry 160. The light transceiver 140 being configured to transmit a light signal to a hammer 120 to measure a hammer velocity, receive a reflected light signal from the hammer 120 indicative of the velocity of the hammer 120 and send an electrical signal to the processing circuitry 160, where the electrical signal is based on the reflected light signal from the hammer 120. The processing circuitry 160 being configured to receive and process the electrical signal so that a time interval between the electrical signal passing through a first trigger point and a second trigger point and the velocity of the hammer 120 can be determined.

53 Claims, 8 Drawing Sheets

(51) Int. Cl.
*G10H 1/14* (2006.01)
*G10F 1/02* (2006.01)

(52) U.S. Cl.
CPC . *G10H 2220/271* (2013.01); *G10H 2220/305* (2013.01)

(58) Field of Classification Search
USPC .................................................... 84/615, 617
See application file for complete search history.

(56) References Cited

U.S. PATENT DOCUMENTS

| | | | | | |
|---|---|---|---|---|---|
| 5,194,685 | A | 3/1993 | Kawamura et al. | | |
| 5,524,521 | A * | 6/1996 | Clift | G10G 3/04 | 84/462 |
| 5,567,902 | A * | 10/1996 | Kimble | G10H 1/0553 | 341/31 |
| 5,627,333 | A | 5/1997 | Stahnke et al. | | |
| 7,843,575 | B1 * | 11/2010 | Starkey | G01B 11/026 | 356/614 |
| 7,893,344 | B2 | 2/2011 | Hirano | | |
| 7,977,561 | B2 | 7/2011 | Folkesson | | |
| 8,013,234 | B1 | 9/2011 | Starkey | | |
| 8,159,683 | B1 | 4/2012 | Starkey | | |
| 9,029,674 | B2 | 5/2015 | Gold | | |
| 9,111,516 | B1 | 8/2015 | Saraceni | | |
| 9,263,017 | B2 | 2/2016 | Lifshitz et al. | | |
| 9,311,906 | B2 | 4/2016 | Zeng | | |
| 2001/0003945 | A1 * | 6/2001 | Muramatsu | G01P 3/36 | 84/658 |
| 2006/0185503 | A1 * | 8/2006 | Fujiwara | G10F 1/02 | 84/626 |
| 2015/0068391 | A1 | 3/2015 | Friesen | | |
| 2016/0098975 | A1 * | 4/2016 | Shepherd | G10H 1/34 | 84/724 |
| 2017/0169805 | A1 * | 6/2017 | Shepherd | G10G 3/04 | |
| 2017/0206869 | A1 * | 7/2017 | Okuyama | G10F 1/02 | |

* cited by examiner

HAMMER VELOCITY MEASUREMENT SYSTEM

CROSS REFERENCE TO RELATED APPLICATIONS

This application is a continuation of U.S. patent application Ser. No. 14/867,275, filed on Sep. 28, 2015, which claims priority from GB patent application serial number 1417448.6, filed on Oct. 2, 2014. The entire contents of the above-mentioned patent applications are incorporated herein by reference.

FIELD OF THE INVENTION

The invention is in the field of hammer velocity measurement systems of keyboard instruments.

BACKGROUND OF THE INVENTION

The music created by a grand piano has a classical and refined sound. Most commonly a musical performance of a pianist is recorded using microphones and played back using speakers. In most cases, the recorded musical performance loses its dramatic and cathartic effect and the essence of the grand piano is lost.

A fuller sound is created by a piano when compared to that produced by a speaker system. There is a growing trend for people to prefer to listen to a piano played in real-time rather than listen to a recorded version of the same performance played through speakers. However, playing, or employing a pianist to play a piano whenever there is a need for music is not often practical, desirable or economical. Automatic pianos provide a solution to this problem.

Automatic pianos are configured to recreate a musical performance from a log of instructions recording how the piano was played and manipulated during the original musical performance. In this way, automatic pianos allow the listener to experience the same or similar quality of sound output produced when the musical performance was originally played. In addition, quality automatic piano systems which use a high quality recording of how a piano was played can give a listener the feeling that they are in the presence of the recording pianist and are experiencing each nuance and fine detail of the musical performance first-hand.

Some conventional recording systems for automatic pianos employ a simple and cheap method of attempting to capture the musical performance of a pianist by measuring the motion of the piano key as it is played. However, the motion of the keys and the movement of the hammer are connected by a very complex and chaotic relationship, which leads to a recording based on the motion of the keys producing very unmusical reproductions when played back on an automatic piano.

Recording the musical performance of a pianist on a piano by using the velocities of the hammers as they move, as a measure of both the loudness and strike-time of a note, provides a more accurate representation not just of the piece of music itself, but also the flair and unique style of the pianist.

One of the major difficulties in attempting to measure the hammer velocity is the constraint of finding an accessible location for the measurement hardware, without involving invasive engineering to the structure and mechanism of the piano. As such, conventional systems that measure the velocity of the hammers of a piano can be very invasive and destructive to the piano, and are irreversible. For example, U.S. Pat. No. 4,307,648 (STAHNKE) discloses a method of using notched shutters inserted into a machined longitudinal slot on each hammer. The notched shutters interrupt an optical switch resulting in an electronic counter being turned on when top edge of the shutter intercepts the optical switch and being turned off when the bottom edge of the notch intercepts the optical switch. The velocity of the hammer is determined from the time counted between the electronic counter being turned on and then off.

As disclosed in the description of U.S. Pat. No. 4,307,648 (STAHNKE), the method necessitates making room for the optical switch assemblies to work with the optical shutters. Additional modifications include thinning of the wrest plank of the piano, reduction of the length of the tuning pins and, often, machining the underside of each wooden key to remove a quantity of wood to make room for additional key-sensor optics. The dual task of simultaneously skimming wood and steel presents serious machining problems and further to this, due to the machining, the keyboard lid is repositioned and often does not close properly over the keys. Additionally, the fitting of the notched shutters to the hammers requires each hammer to be removed and clamped in a jig so that a very fine slit (0.254 mm or one ten-thousandth of an inch) and a 1.5 mm hole can be machined to fasten the notched shutter or “flag”. The hammers then need to be re-inserted into the piano which results in a time consuming task of realigning the hammers in the piano, this often leads to the hammers not being aligned correctly which negatively effects the music produced by the piano. As a consequence of removing wood from the piano keys the whole piano action is then wrongly weighted which requires extra weights to be measured and added to each key. Modifications of this kind are largely irreversible and cause a piano to lose at least some of its original integrity.

A further example of recording hammer velocities is given in U.S. Pat. No. 5,627,333 (STAHNKE) which moves away from the idea of using hammer flags or shutters and instead discloses calculating the time between a hammer assembly intersecting a first and a second optical beam from first and second photo-interrupters, respectively, and then determining the hammer velocity from the calculated time.

U.S. Pat. No. 5,627,333 (STAHNKE) also discloses a method for correcting the position of the second photo-interrupter post-installation as the second photo-interrupter can deviate from its correct position and cause a recording log to be different to the original performance that was played. The post-installation method involves calculating a correct distance from the impact point of each hammer on each respective string at which to place each second photo-interrupter, and displaying the correct distances for each key on a screen for a user to tune each respective second photo-interrupter. The need to perform a post-installation correction to the system of U.S. Pat. No. 5,627,333 (STAHNKE) in this way is an indication that using first and second photo-interrupters is a method that is not consistently accurate over time and with changing environmental conditions. Also this method is very time consuming and difficult to perform accurately, with emphasis on the correct mechanical alignment and measurement of multiple components.

U.S. Pat. No. 5,194,685 (KAWAMURA et al.) also moves away from using hammer flags and discloses reflecting light from a hammer to determine the velocity of the hammer and claims to provide a system that is not very invasive with reduced production steps. U.S. Pat. No. 5,194,685 (KAWAMURA et al.) uses the strength of a reflected light signal to determine the distance of the hammer from the sensor.

Differentiation is then used to determine firstly the velocity and secondly the acceleration of the hammer at incremental differences in position which involves considerable computational processing. Further to this, U.S. Pat. No. 5,194,685 (KAWAMURA et al.) performs unspecified weak, medium and strong strength test strikings and stores digital signals associated with each test strike as standards in a correction table. The table is then used to categorise future strikings as one of weak, medium or strong strength strikings and the value of velocity calculated is corrected according to this table resulting in the calculated velocities being generalised into velocities that do not correctly represent the original performance of the pianist on the piano. U.S. Pat. No. 5,194,685 (KAWAMURA et al.) has not been commercially implemented in the 21 years since the publication of U.S. Pat. No. 5,194,685 (KAWAMURA et al.) in 1993.

It is advantageous that when recording the musical performance of a pianist for playback on an automatic piano, it is known which key of the keyboard has been pressed to determine at least when a string damper of the piano is in contact with its respective string. Both U.S. Pat. No. 5,627,333 (STAHNKE) and U.S. Pat. No. 5,194,685 (KAWAMURA et al.) use key sensors to do this, however both of these methods require sensors to be installed beneath each key of the keyboard which can be a time consuming task that requires the underside of each key to be slimmed down and which will result in the keys needing to be corrected so they are not off balanced, as mentioned above.

It is important that, when moving away from the use of hammer flags by instead implementing optical sensors, as in U.S. Pat. No. 5,194,685 (KAWAMURA et al.), the light-sensitive optical systems are shielded from daylight and artificial tungsten light during use, and also during calibration. Typically when the keyboard and optics are returned to their proper place in the keyboard instrument they are largely shielded from ambient light. If, however, bright studio lights are used to illuminate the piano, special precautions may be necessary.

Thus, it is an objective of the invention to provide a hammer velocity measurement system that can be successfully implemented using non-invasive and non-destructive procedures to fit the system to a keyboard instrument. A further objective of the invention is to provide a system that once removed from a keyboard instrument does not render the keyboard instrument defunct, or at least preserves more of the integrity of the keyboard instrument than prior art systems. A further objective of the invention is to provide a more precise and accurate representation of how the keyboard was manipulated by a pianist. A further objective of the invention is to provide a hammer velocity measurement system that is easier and quicker to set up and calibrate. A further objective of the invention is to provide a way of identifying when each key is pressed in an accurate and non-invasive way.

SUMMARY OF THE INVENTION

According to a first aspect of the invention, there is provided a system for determining the velocity of a hammer of a keyboard instrument comprising a light transceiver and processing circuitry. The light transceiver is configured to transmit a light signal to a hammer to measure a hammer position, receive a reflected light signal from the hammer indicative of the position of the hammer and send an electrical signal based on the reflected light signal from the hammer to the processing circuitry. The processing circuitry is configured to receive and process the electrical signal so that a time interval between the electrical signal passing through a first trigger point representative of a first hammer position and a second trigger point representative of a second hammer position, and hence the velocity of the hammer, can be determined.

In this way, the use of first and second trigger points, representative of first and second hammer heights, respectively, combined with use of a light transceiver has the effect that less processing has to occur to reach accurate values of velocity in contrast to U.S. Pat. No. 5,194,685 (KAWAMURA et al.) which calculates incremental differences in the velocity of the hammer as the hammer moves to strike the string and then generalises and modifies the velocity as set out by a table of uncalibrated weak, medium and strong strength strikings. Further to this a less complex hammer velocity mechanism needs to be implemented as there is no requirement to fit perpendicular optical beams relative to the hammer movement as needed in U.S. Pat. No. 5,627,333 (STAHNKE), which makes the installation of the hammer velocity measurement system easier and quicker. Furthermore, the first and second trigger points are quick to set up and are easy to make accurate.

Secondly, because the system is more accurate, easier to install and set up, a practical alternative to the hammer flag system is achieved. In this way, fewer invasive procedures need to be carried out in order to record the playing of the keyboard instrument making the installation of the system cheaper, more efficient and less destructive to the keyboard instrument. The hammers of the keyboard instrument do not need to removed and modified and then realigned in the keyboard instrument, as in U.S. Pat. No. 4,307,648 (STAHNKE), which is a time consuming and trying task, and so the system is more accurate and less invasive. Also, as no wood has been removed from the keyboard instrument no counter weights need to be added to the keyboard instrument to compensate for the removed wood. The action structure of the keyboard instrument need not be machined to accept mountable hardware. Using the velocity of the hammers rather than the motion of the keys of the keyboard instrument to record the playing of the keyboard instrument is a much more accurate representation of the original musical performance.

Preferably, the light signal is a visible light signal or an infra-red light signal.

The first and second trigger points may be voltages stored by the processing circuitry.

The processing circuitry may be configured to store the first and second trigger points on first and second sample-and-hold devices.

According to one implementation, the first trigger point may represent a first hammer position at a first hammer height and the second trigger point may represent a second hammer position at a second hammer height. Preferably, the first trigger point and the second trigger point may represent first and second hammer positions at first and second hammer heights separated by one of: 3 to 7 mm, 4 to 6 mm and 5 mm. Preferably, the second trigger point may represent a second hammer position at a second hammer height at one of: a position from 1 mm to 0.1 mm below a strike position of the hammer; and 0.5 mm below a strike position of the hammer. The advantages of positioning the hammer heights so close to the strike position of the hammer is that firstly, the hammer is at a terminal velocity and so the calculation required to determine the velocity is less complex and more accurate than if the hammer heights were positioned in such a way so that the hammer velocity was one value at $H_1$ and a different value at $H_2$, and secondly, the strike of the hammer does not interfere with the time measurement and hence the velocity measurement. Positioning the hammer heights close together minimises the potential for differences in velocity to arise and reduces the need to take incremental velocity readings as in U.S. Pat. No. 5,194,685 (KAWAMURA et al.).

The processing circuitry may be configured to store a third trigger point and to receive and process the electrical signal when it passes through a third trigger point. The third trigger point may be representative of a third hammer position at a third hammer height which represents when a damper is no longer in contact with a string associated with the hammer. An advantage of having a third trigger point, as opposed to the key sensor systems of U.S. Pat. No. 5,627,333 (STAHNKE) and U.S. Pat. No. 5,194,685 (KAWAMURA et al.), is that the need for a separate system to detect when the damper is lifted off the string is eliminated and the keyboard instrument retains its character by the reduction of invasive procedures required to be carried out.

Preferably, the electrical signal is an analogue signal.

According to one implementation, the light transceiver is an infra-red light source and a phototransistor.

According to a preferred implementation, the light transceiver may be configured to transmit a light signal to a hammer shank of a hammer to measure a hammer position and receive a reflected light signal from the hammer shank of the hammer indicative of the position of the hammer. An advantage of sending and receiving a light signal from the hammer shank is that the light transceiver does not interfere with the movement and strike of the hammer on the string of the keyboard instrument and can thus determine an accurate hammer velocity for the hammer. A second advantage is that any cross-talk is reduced when compared to systems that use optical beams perpendicular to the movement of the hammer as in U.S. Pat. No. 5,627,333 (STAHNKE). Additionally, the close proximity of the hammer shank to the light transceiver means the view of the light transceiver will be largely blocked by the hammer shank which reduces light from neighbouring hammer shanks from being received by the phototransistor and so the electrical signal received by the processing circuitry is more likely to be a realistic and accurate indication of the hammer position.

Preferably, the processing circuitry comprises a logic block configured to generate a logic signal that is calculated from the electrical signal received from the light transceiver and that is representative of the time interval between the electrical signal passing through the first trigger point and the second trigger points. The logic signal preferably has a first pulse representative of when the electrical signal passes through the first trigger point, and a second pulse representative of when the electrical signal passes through the second trigger point. The leading edges of the first and second pulses of the logic signal represent when the electrical signal passes through the first and second trigger points respectively. The second pulse of the logic signal may be configured to be sustained until the electrical signal passes back through the second trigger point and, optionally, reaches the first trigger point again.

Preferably, the processing circuitry comprises a shift register configured to output a signal representative of the electrical signal. Optionally, the shift register is configured to output a signal representative of the logic signal.

The system may comprise a central processing unit and a clock signal having clock pulses. The central processing unit may be arranged to count a number of clock pulses between the electrical signal passing through the first trigger point and the second trigger point as represented by a logic signal. Preferably, the number of clock pulses represents the inverse hammer velocity (IHV). According to a preferred implementation, the central processing unit may be configured to take the reciprocal of the IHV to determine the velocity of the hammer. Preferably, the clock pulses are in one of the following frequency ranges: 10 kHz to 40 kHz, 15 kHz to 35 kHz, and 20 kHz to 30 kHz. In one implementation, the clock pulses are latch pulses arranged also to control a shift register.

Optionally, the hammer defines a hammer axis running along the length of the hammer shank and the light transceiver may comprise a light source and a light receiver wherein a longitudinal axis running between the light source and the light receiver is configured to align substantially with the longitudinal axis of the hammer. Preferably, the longitudinal axis of the light transceiver runs between the centre of both the light source and the light receiver. In this way, cross talk between neighbouring light transceivers is reduced and so the reflected signal received by the phototransistor will be a more accurate representation of the position of the hammer, this in turn means the determined velocity will also be more accurate.

The system may comprise light transceivers of adjacent hammers that are configured to be coupled to different relative points on adjacent hammers. In this way, any cross talk is further reduced because the light source will not be in line with the phototransistor of a neighbouring hammer and so reflected light is less likely to be received by the phototransistor of the neighbouring hammer, which in turn means the time recording and the determination of the velocity of the hammer will be more precise and an accurate representation of the original music played on the keyboard instrument will be obtained.

Preferably, the shift registers of all hammer modules are arranged together to form a parallel-in serial-out shift register arranged to be clocked and latched by a central processing unit to move the information representing the electrical signal for each hammer to the central processing unit.

Preferably, the light transceiver and processing circuitry together form a hammer module wherein each hammer module is preferably coupleable to a central processing unit of the system.

Preferably, the hammer module is configurable to be associated with one hammer.

The system may comprise several hammer modules arranged to form a group module. Preferably, each hammer module in the group module is physically interconnected to an adjacent hammer module. The group module preferably consists of one or more of the following: four hammer modules, five hammer modules and six hammer modules. By grouping the modules to match the grouping of hammers in a conventional mechanical construction of a keyboard instrument, installation of the modules is made simpler and quicker. Grouping of the modules also decreases the quantity of circuitry needed to couple each module to a central processing unit, thus decreasing the complexity of the system.

According to a preferred implementation of the invention, each group module is mounted on a printed circuit board and the printed circuit board may comprise a magnet so that the group of modules is magnetically coupleable to a corresponding group of hammers. Alternatively, each group module comprises a magnet so that the group module is magnetically coupleable to a corresponding group of hammers. The magnet of the printed circuit board or the group module may be coupleable to a saddle made from or comprising steel, or other magnetic material, which is attached to hammer flanges of the corresponding group of hammers. The saddle may have two longitudinal raised parallel rails to which the magnets of the printed circuit board attach. The saddle may also have a pair of dowels at the end of the parallel rails where the dowels are configured to engage with the printed circuit board to help with alignment. The saddle may be connected to the group of hammers using existing screws of the outer two hammer flanges of the group of hammers. The saddle has the benefit of creating consistent attachment points of the printed circuit boards between each group of hammers, this also means the modules are consistently positioned relative to modules associated with neighbouring groups of hammers. Additionally, no extra screws are needed to secure the saddle to the hammer flanges. The use of magnets has the advantage of making the installation process easier, quicker and simpler. Also, a piano technician can temporarily lift a printed circuit board out of the way without any screws or tools, and it can simply be put back on its dowels, allowing the magnets to do the rest of the work, and hence, the need for specialised tools to attach the system to the saddle is eliminated. Additionally, as no additional screws are used to attach the printed circuit board to the saddle, there is less potential for screws to be lost in and interfere with the complex mechanisms of the keyboard instrument.

According to another aspect of the invention, there is provided a calibration module for calibrating the system for determining the velocity of a hammer of a keyboard instrument. The calibration module comprises a first input, a second input and an output configured to couple to the processing circuitry. The output is configured to send a first electrical output signal to the processing circuitry when the first input is activated which instructs the processing circuitry to store the electrical signal supplied to the processing circuitry by the light transceiver as the first trigger point. The output is configured to send a second electrical output signal to the processing circuitry when the second input is activated which instructs the processing circuitry to store the electrical signal supplied to the processing circuitry as the second trigger point.

Preferably, the calibration module further comprises a third input. The third input may be configured to send a third electrical output signal to the processing circuitry when the third input is activated which may instruct the processing circuitry to store the electrical signal supplied to the processing circuitry by the light transceiver as the third trigger point.

Preferably, the first and second inputs are buttons.

Preferably, the first, second and third inputs are buttons.

According to another aspect of the invention there is provided a calibration method for calibrating the system for determining the velocity of a hammer of a keyboard using the calibration module. The system is installed on a keyboard instrument with at least one hammer. The system comprises a light transceiver and processing circuitry configured to determine the velocity of the at least one hammer.

The calibration method comprises coupling the calibration module to the processing circuitry of the at least one hammer of the keyboard instrument, setting the at least one hammer to a first hammer height, activating a first input of the calibration module, instructing the processing circuitry to store the voltage supplied by the light transceiver as a first trigger point, and then repeating for a second hammer height and a second trigger point. An advantage of setting the first and second trigger points so that they are representative of first and second hammer heights is that set up is quicker and easier. The calibration method accounts for the reflective properties of each hammer and so no special reflective paints or labels are necessary. This means the system is easier to install and more cost effective.

According to a preferred embodiment of the invention the calibration may further comprise setting the at least one hammer to a third hammer height, activating a third input of the calibration module and instructing the processing circuitry to store the voltage supplied by the light transceiver as a third trigger point. The third trigger point may be representative of the hammer position at which the damper is lifted from the string associated with the hammer.

According to another aspect of the invention, there is provided a system for magnetically attaching a printed circuit board for measuring a hammer velocity of a keyboard instrument. The system may comprise one or more magnets attached to the printed circuit board or additionally or alternatively one or more engagement points for engaging with one or more respective magnets attached to a keyboard instrument. The system may further comprise a saddle arranged to be attached to the keyboard instrument. Preferably the saddle is arranged to be attached to hammer flanges of a group of hammers, whereby the saddle is attached using the screws of one or more hammer flanges. The saddle may comprise two longitudinal raised parallel rails to which the printed circuit board magnetically couples and a pair of dowels at the ends of the rails to engage with the printed circuit board and help with alignment. The one or more magnets provide a quick and easy way of removing the printed circuit board, and hence the modules, from the keyboard instrument. The saddle provides a consistent way of aligning the modules associated with different groups of hammers. The saddle also reduces the amount of screws used in the attachment and hence reduces the potential for screws to be lost in the internal mechanisms of the keyboard instrument. The printed circuit board can also be temporarily lifted out of the way, without any tools or screws, and put simply back on the pair of dowels, perhaps by a piano technician.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
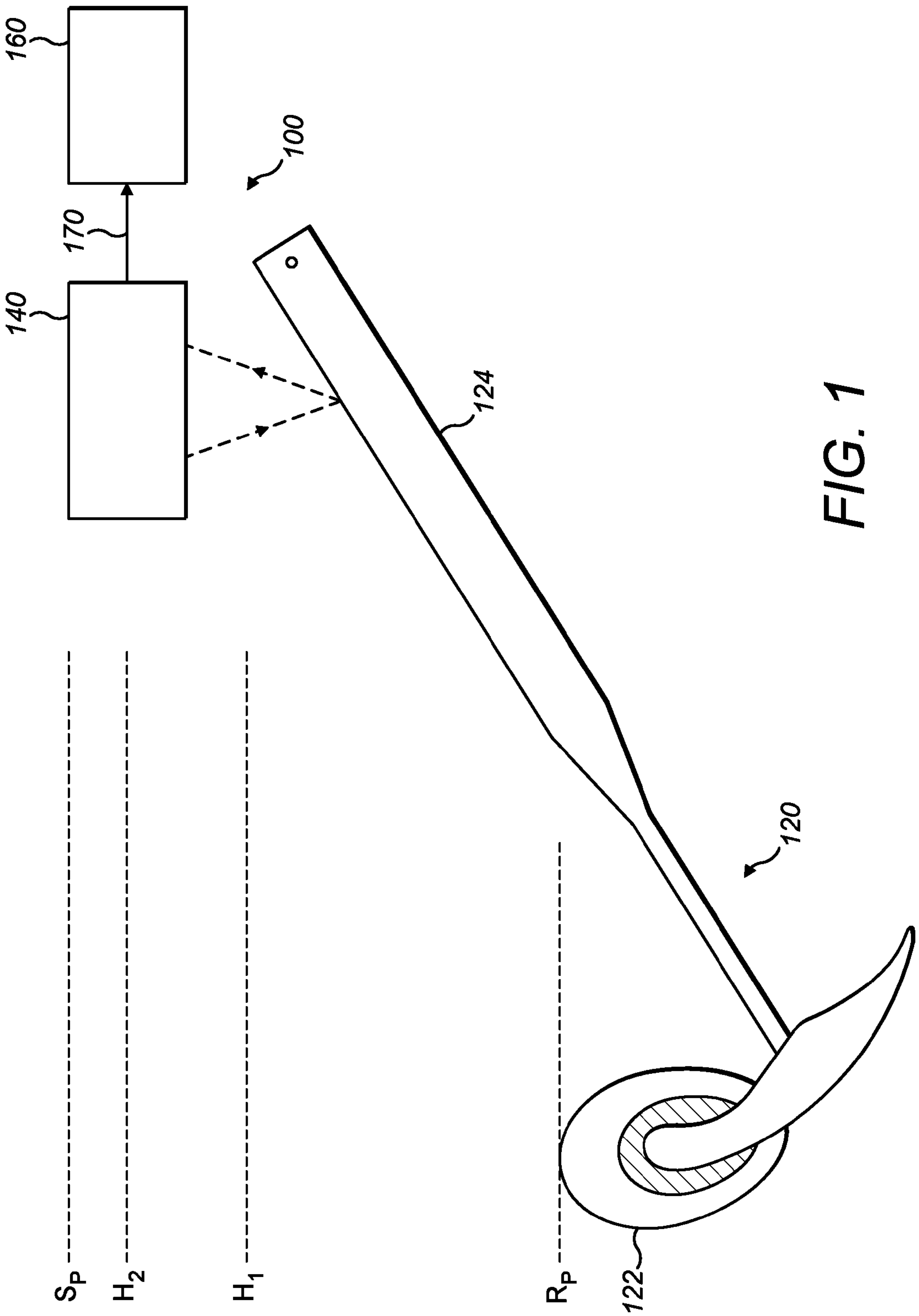
FIG. 1 is a schematic diagram that shows a system for determining the velocity of a hammer of a keyboard instrument using two reference hammer heights.

FIG. 1 shows a system 100 for determining a velocity of a hammer 120 of a keyboard instrument using two reference hammer heights $H_1$ and $H_2$. The system 100 has a light transceiver 140 and processing circuitry 160 and is attached to a keyboard instrument comprising a hammer 120. As the hammer 120 moves from a rest position, $R_p$, (where the hammer is inactive) to a strike position $S_p$ (where the hammer strikes a string of the keyboard instrument) the hammer head 122 of the hammer 120 moves through a first hammer height, $H_1$, and a second hammer height, $H_2$. Meanwhile, the light transceiver 140 transmits a light signal to a hammer shank 124 of the hammer 120 to measure a hammer position.

The light transceiver 140 receives a reflected light signal from the hammer shank 124 indicative of the position of the hammer 120. The light transceiver 140 sends an electrical signal 170, based on the reflected light signal from the hammer shank 124, to the processing circuitry 160. The processing circuitry 160 receives and processes the electrical signal 170 so that a time interval between the electrical signal 170 passing through a first trigger point representative of a first hammer position and a second trigger point representative of a second hammer position and the velocity of the hammer 120 can be determined. The electrical signal 170 is an analogue signal, although alternatively it could be an analogue current signal or digital signal.

The light transceiver is made up of a light source 142 and a phototransistor 144. The light signal sent by the light source 142 of the light transceiver 140 is preferably a visible light signal or an infra-red light signal and hence the light source 142 may be a visible light source or an infra-red light source. The signal could be any other suitable electromagnetic signal.

Using the velocity of the hammers of a keyboard instrument to record how the keyboard instrument was played, later gives a more accurate and precise reproduction when compared to using the motion of the keys of the keyboard instrument. This is because the relationship between the keys and the hammer is not straightforward and is in fact highly complex. Using the velocity of the keys of the keyboard instrument results in recordings that are very unmusical and do not accurately represent the original piece played on the keyboard instrument.

The first trigger point is a voltage and represents the first hammer position at hammer height $H_1$. The second trigger point is also a voltage and represents the second hammer position at the second hammer height $H_2$. The trigger points may alternatively be or represent analogue current values or digital values. As shown in FIG. 1, hammer heights $H_1$ and $H_2$ represent first and second positions of the hammer head 122. The hammer head 122 will always travel from a rest position $R_p$ to a strike position $S_p$ when used in a keyboard instrument such as a grand piano and so associating the position of the hammer head 122 with the first and second trigger points allows the system 100 to be used in different keyboard instruments even though the length of the hammer shank, the length of the hammer head and the position of light transceiver may change between instruments (i.e. the uncertainties surrounding the configuration of different pianos is avoided) and even between hammers on the same instrument.

Using the position of the hammer head 122 in combination with the first and second trigger points, as opposed to using the position of the hammer shank 124, also means that the recorded musical performance is not limited to being played back on keyboard instruments of the same make or type as the one used in the original performance. In fact the performance can be played back on any variation of the keyboard instrument.

The first and second trigger points which electrically represent the first and second hammer heights are able to be changed during a calibration process, and optionally may also be at pre-set values which are set during the production of system 100. By having calibrated trigger points, allowing the trigger points and the hammer heights to be made bespoke not only for each different keyboard instrument but also for each hammer of the keyboard instrument, there is increased precision of the calculated hammer velocity, as each hammer is treated individually, which also increases the precision and the accuracy of any recordings made. The first and second trigger points are stored by the processing circuitry 160.

In an alternative embodiment, the first and second trigger points may be other electrical values, such as current values.

The first and second hammer heights, $H_1$ and $H_2$, are preferably separated by a distance of 5 mm. Although $H_1$ and $H_2$ may be separated by one of: 4 to 6 mm or 3 to 7 mm. The second hammer height, $H_2$, is preferably 0.5 mm below the strike position, $S_p$, of the hammer 120. Although, the second hammer height, $H_2$, could be positioned at any point that is between 1 mm and 0.1 mm below the strike position, $S_p$, of the hammer 120. An advantage of positioning the hammer heights, $H_1$ and $H_2$, so close to the strike position, $S_p$, of the hammer 120 is that the hammer is at a terminal velocity and so the calculation required to determine the velocity from the time interval between the hammer head 122 passing through $H_1$ and then $H_2$ is less complex and more accurate than if the hammer heights were positioned in such a way so that the velocity of the hammer 120 was appreciably different at $H_1$ compared with at $H_2$. Positioning the hammer heights, $H_1$ and $H_2$, close together minimises the potential for differences in velocity to arise. Positioning hammer height $H_2$ that a distance of 0.5 mm below the string height helps to ensure the strike of the hammer does not interfere with the time measurement of the interval between the hammer passing between the first and second hammer positions represented by $H_1$ and $H_2$ respectively.

A further advantage of using trigger points associated with different heights of the hammer 120 together with the system 100 is that the procedure is less invasive than those known in the art and allows the piano to retain its integrity by being functional even if the system 100 were to be removed.

Using trigger points in combination with system 100 as opposed to fitting hammer flags to each hammer and using an optical sensor eliminates the need to remove each hammer from the keyboard instrument in order to machine a slit and a hole in each hammer in order to fit the flag. To re-fit the hammers to the keyboard instrument, after an addition of a flag, is a demanding task and aligning the hammers correctly is time consuming and tricky which may result in the hammers not being aligned properly and the keyboard instrument not playing in the correct way.

An advantage of sending and receiving a light signal from the hammer shank 124 of the hammer 120 as opposed to the hammer head 122 of the hammer 120 is that the light transceiver 140 does not interfere with the movement and strike of the hammer on the string of the keyboard instrument whilst also determining an accurate hammer velocity for the hammer 120.

Figure 2:
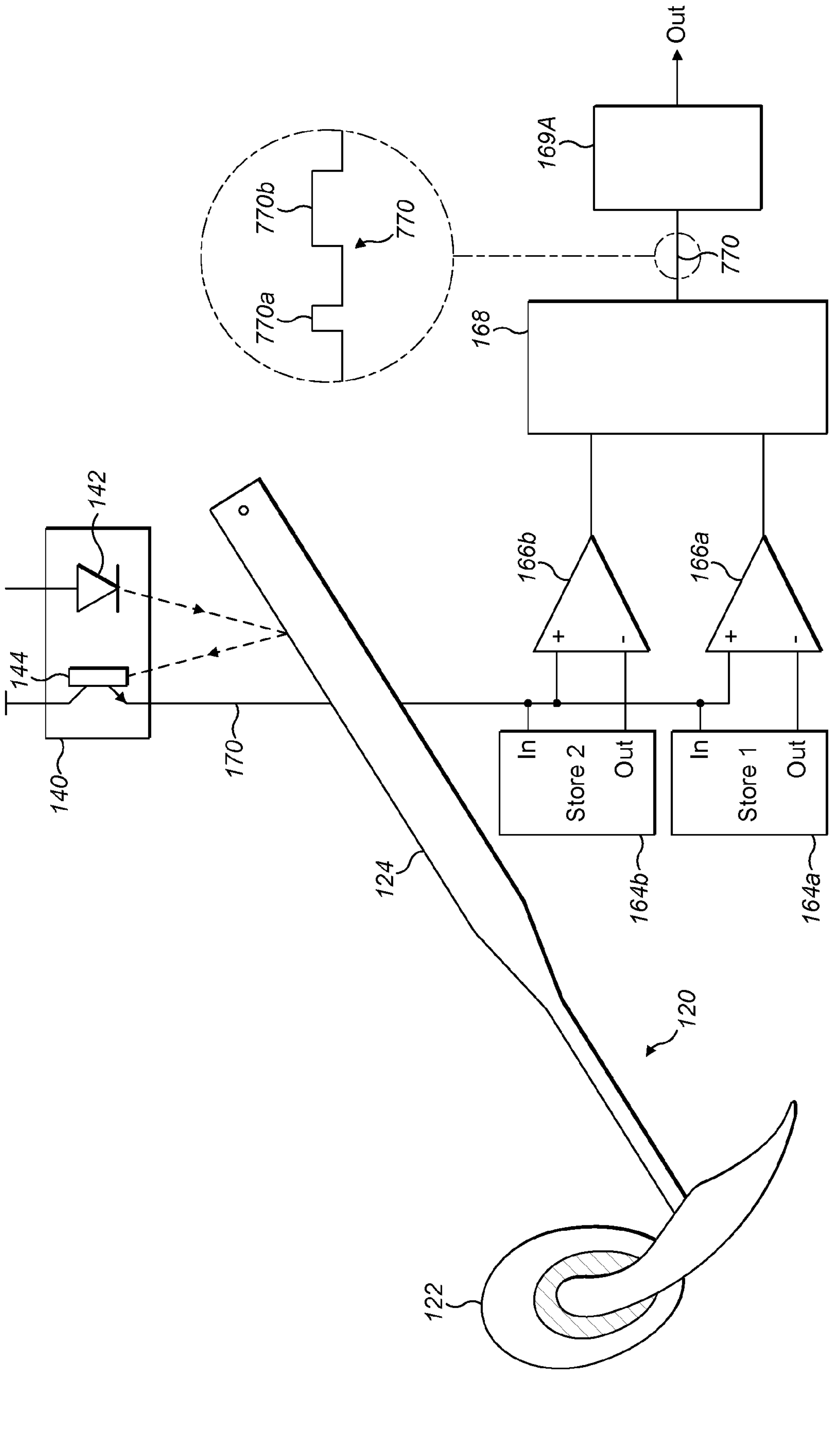
FIG. 2 is a schematic circuit diagram showing the system of FIG. 1.

FIG. 2 is a schematic circuit diagram showing the system 100 of FIG. 1. The processing circuitry 160 receives the electrical signal 170. Processing circuitry 160 includes first and second sample-and-hold devices 164*a* and 164*b*, first and second comparators 166*a* and 166*b*, a logic block 168 and a shift register 169A.

The first sample-and-hold device 164*a* stores the voltage of the first trigger point. The second sample-and-hold device 164*b* stores the voltage of the second trigger point. The first and second comparators 166*a* and 166*b* are coupled to the first and second sample-and-hold devices 164*a* and 164*b*, respectively. Each comparator 166*a* and 166*b* receives the electrical signal 170 and compares the voltage of the received electrical signal 170 with the corresponding stored voltage of the corresponding sample-and-hold device 164*a* and 164*b*. The comparators 166 each send a signal to the logic block 168 which describes the status of the voltage of the electrical signal 170 in relation to the first and second trigger points. Logic block 168 generates a logic signal 770 calculated from the electrical signal 170 received from the light transceiver 140 and the first and second trigger points.

The logic signal 770, shown in more detail in the call-out of FIG. 2, is representative of the time interval between the electrical signal 170 passing through the first trigger point and the second trigger point. If the logic block 168 receives a signal from the first comparator 166*a*, that signifies the voltage of the electrical signal 170 is the same as or greater than the first trigger point voltage, e.g. the comparator 166*a* sends a "1" signal, the logic block 168 produces a first pulse 770*a* where the leading edge of the first pulse 770*a* denotes the moment electrical signal 170 passes through the first trigger point and hence the moment the hammer 120 passes through $H_1$. If the logic block 168 receives a signal from the second comparator 166*b* that the voltage of the electrical signal 170 is the same as or greater than the second trigger point voltage the logic block 168 produces a second pulse 770*b* wherein the leading edge denotes the moment electrical signal 170 passes through the second trigger point and hence, the moment the hammer 120 passes through $H_2$. Thus, the logic signal 770 has a first pulse 770*a* representative of when the electrical signal 170 passes through the first trigger point, and a second pulse 770*b* representative of when the electrical signal 170 passes through the second trigger point.

The first pulse 770*a* is shorter than the second pulse 770*b* and needs to be short enough so that the first pulse 770*a* can transition from logic "0" to logic "1" and back to logic "0" before the second pulse is produced. The second pulse 770*b* is long relative to the first pulse because the second pulse 770*b* is sustained by the logic block 168 until the electrical signal 170 passes back through the second trigger point and reaches the first trigger point again, as the hammer 120 moves downward after a strike. In other words, the falling edge of the second pulse 770*b* denotes the time at which the hammer 120 passes through $H_1$ for the second time after the hammer 120 has impacted the string, measured by comparator 166*b*. An advantage of using two pulses on one logic signal is that there is one signal which contains all of the information, and as a result the shift register 169A only has to process one signal.

Occasionally, once a hammer has hit a corresponding string the hammer may oscillate near the string. In prior art systems this may cause additional information to be generated, sometimes resulting in the piano recorder recording non-existent or extraneous strikes. To overcome the fluctuations of the hammer causing the piano recorder to record non-existent hammer strikes, logic block 168 ensures that once the leading edge of second pulse 770*b* has first occurred the second pulse 770*b* remains at logic high until the hammer passes back through hammer height $H_1$, even if the hammer 120 oscillates further through $H_2$. Any fluctuations of the hammer through hammer height $H_2$ are ignored as extraneous strikes and filtered out, which results in a more accurate and useful file of data being stored in the central processing unit 180, and non-existent, or extraneous, hammer strikes are not recorded and hence replayed later. Also, with a clean leading edge of the second pulse, the central processing unit 180 is able to calculate hammer velocities much more quickly and efficiently (see the following paragraphs explaining that the hammer velocity is calculated from the time between the rising edge of the first pulse 770*a* of the logic signal 770, and the rising edge of the second pulse 770*b* of the logic signal 770). If the fluctuations of the hammer through $H_2$ are recorded, as in existing systems, low velocity signals or extraneous strikes that do not represent a hammer strike would be present in the recording which may negatively affect the piano performance, especially when true notes are required from the same hammer shortly after an extraneous strike.

The logic signal 770 is sent to the shift register 169A. The shift register 169A outputs a signal representative of the logic signal 770.

The light transceiver 140 and the processing circuitry 160 together form a hammer module of the system 100. Several hammer modules of the system are arranged to form a group module. Each hammer module in a group module is physically interconnected to an adjacent hammer module in the group module.

Figure 3:
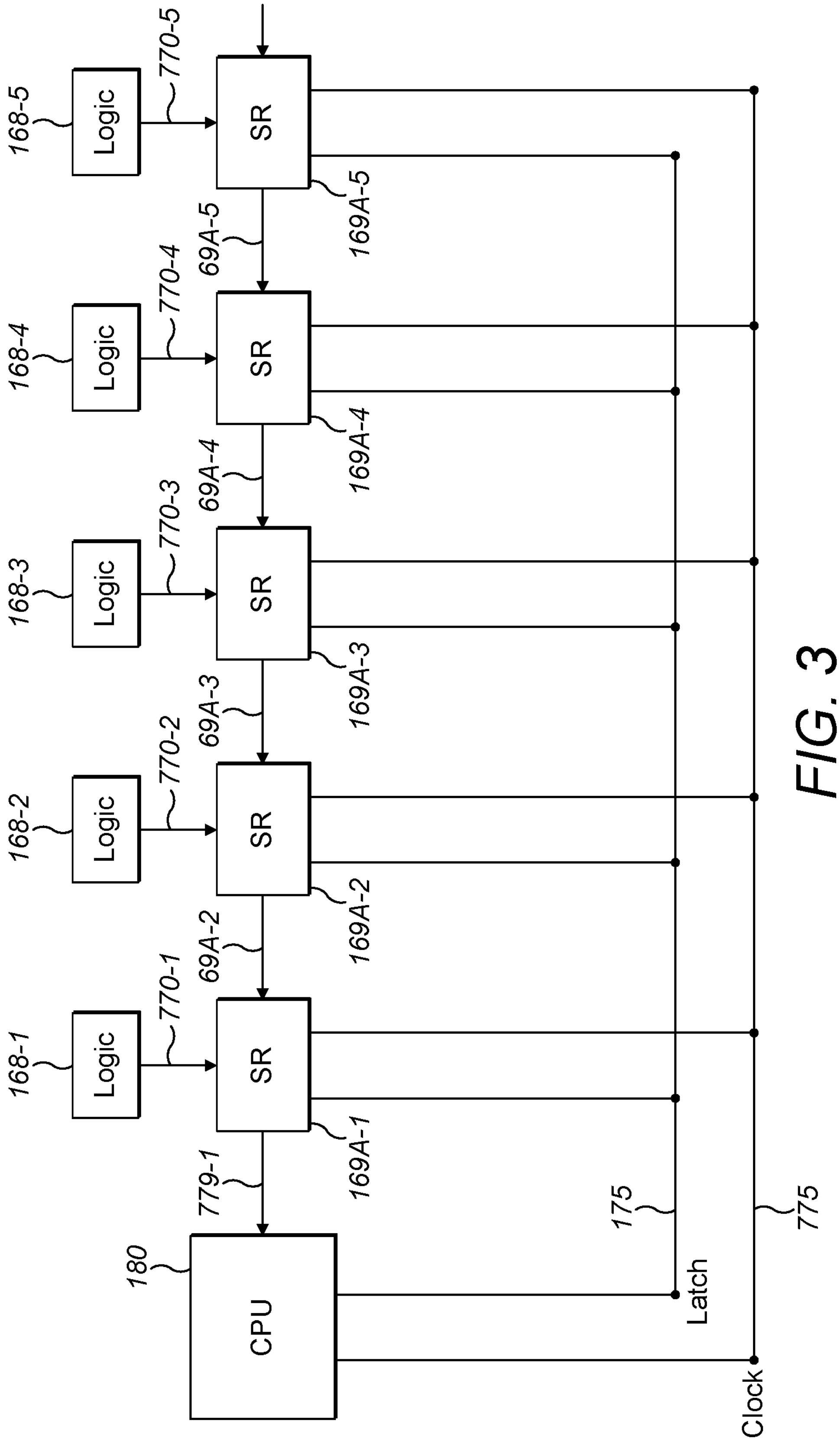
FIG. 3 is a schematic diagram that shows some of the circuitry of a group module.

FIG. 3 is a schematic diagram showing some of the circuitry of a group module. The group module comprises five hammer modules and for simplicity only the logic blocks 168-1, 168-2, 168-3, 168-4 and 168-5 are shown of each hammer module. The shift registers 169A-1, 169A-2, 169A-3, 169A-4 and 169A-5 of adjacent hammer modules are arranged together to form a parallel-in serial-out shift register which is arranged to be clocked by signal line 775 and latched by signal line 175 from a central processing unit 180 to move the logic signal 770 for each hammer to the central processing unit 180.

The latch signal on signal line 175 loads the values of the logic signals 770-1, 770-2, 770-3, 770-4 and 770-5 (parallel data) produced by the corresponding logic blocks 168-1, 168-2, 168-3, 168-4, and 168-5 into the corresponding shift registers 169A-1, 169A-2, 169A-3, 169A-4 and 169A-5 at a frequency of approximately 25.6 kHz. The value of each logic signal 770-1, 770-2, 770-3, 770-4 and 770-5 will be either a logic "0" or a "1". The shift registers 169A, in response to the clock signal on signal line 775, clock out each value that they hold in a leftward direction to the central processing unit 180 via downstream shift registers. The shift registers 169A are clocked at a frequency of 2.56 MHz.

The central processing unit 180 populates a file of binary data for each hammer 120 that represents the logic signal 770. The central processing unit 180 is arranged to count the number of latch pulses between the leading edge of the first pulse 770*a* and the leading edge of the second pulse 770*b* for each hammer 120. The number of latch pulses represents the inverse hammer velocity (IHV). The central processing unit 180, determines the velocity of the hammer 120 by taking the reciprocal of the IHV. Alternatively, the central processing unit 180 may count the clock pulses of the shift registers instead of the latch pulses.

Preferably, the shift register clock pulses are at 2.56 MHz however they may be in one of the following ranges 1 MHz to 4 MHz, 1.5 MHz to 3.5 MHz and 2 MHz to 3 MHz. The latch signal frequency will depend on the number of keys in the keyboard instrument, and needs to be lower than the clock frequency to allow the parallel-in serial-out shift register arrangement to transfer all the information to the CPU 180. For example, if there are 100 keys the latch signal 175 needs to be at least 100 times slower than the clock signal.

The hammer modules 150 in FIG. 3 are in a group module comprising five hammer modules however, a group module optionally may comprise four or six hammer modules. The hammer modules are grouped in this way to match the conventional distribution of hammers in several groups in a keyboard instrument. The grouping of hammers, and thus modules, allows for the mechanical construction of the keyboard instrument and the easy installation of the system 100 into the keyboard instrument. The quantity of circuitry needed to couple each single module to the central processing unit 180 is reduced, as each group module of hammer modules 150 may use a single connection, thus decreasing the complexity of the system 100. Each group module is interconnectable with adjacent group modules to relay the latch, clock and data signals therethrough, ultimately from and to the CPU 180.

Figure 4:
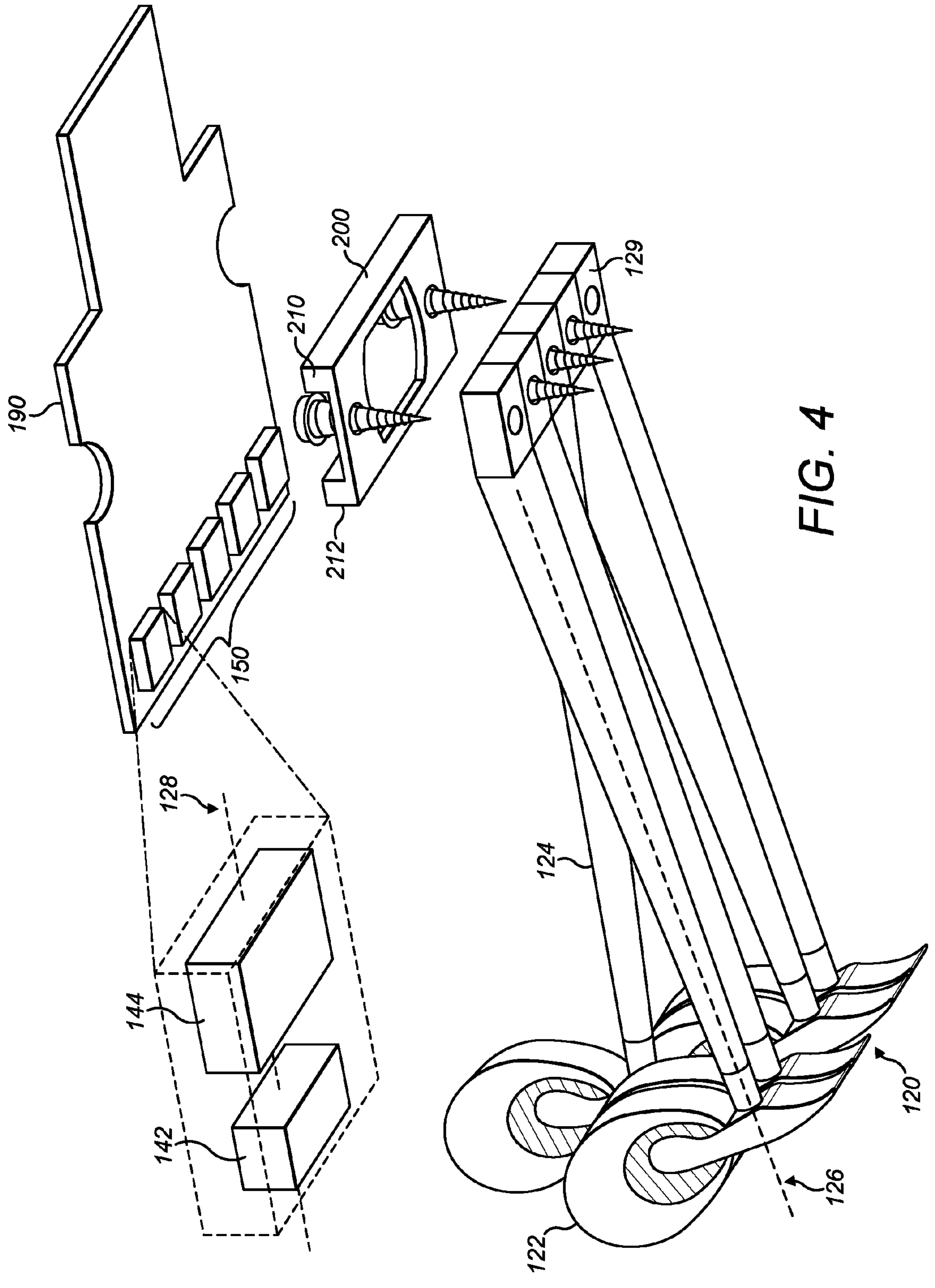
FIG. 4 is a perspective view of a magnetic attachment between a group module of FIG. 3 and a corresponding group of hammers of a keyboard instrument.

FIG. 4 shows a perspective view of a magnetic attachment between a group of five hammers of a keyboard instrument and the group module 150 of FIG. 3. Each hammer 120 has a hammer flange 129. Each hammer flange 129 has a hole to receive a screw which acts to attach the hammer flange 129, and hence the hammer 120, to the piano. A saddle 200 is positioned between the group of hammers and the group module 150 which is mounted on a printed circuit board 190. The printed circuit board 190 has magnets that are magnetically coupleable to the saddle 200. The magnets may be neodymium magnets. The saddle 200 has two longitudinal raised parallel rails, 210 and 212, upon which the printed circuit board 190 magnetically attaches to and rests. The saddle 200 also has a pair of dowels at the end of the parallel rails, 210 and 212, which engage with corresponding cut-outs 192 on the printed circuit board 190 to help with alignment. Alternatively, screw heads may be used instead of dowels. The saddle 200 comprises either magnetic parts or is otherwise magnetically attractive to correspond to the magnets of the printed circuit board 190. Alternatively, the saddle 200 may comprise magnets or magnetic parts, and the printed circuit board 190 comprises magnetically attractive parts to correspond to the magnetic saddle 200.

The saddle 200 is connected to the group of hammers using the screws of the first and the fifth hammer flanges of the group of hammers, whereby the first and the fifth hammers are located on either side of the group of hammers. The screws of the first and the fifth hammer flanges 129 are long enough to take into account the thickness of the saddle 200. Using the saddle 200 has the benefit of creating consistent attachment points for the printed circuit board 190 to a corresponding group of hammers, and also means the modules 150 are consistently positioned relative to modules associated with neighbouring groups of hammers. As the saddle 200 is attached re-using screws of the outer hammer flanges 129 associated with the outer hammers 120 of the group of hammers, no extra screws are needed to secure the saddle 200 to the hammer flanges 129. The use of magnets has the advantage of making the installation process easier, quicker and simpler. Furthermore, the need for specialised tools to attach the system 100 to the saddle 200 is eliminated. Additionally, as no additional screws are used to attach the printed circuit board 190 to the saddle 200 there is less potential for screws to be lost in the complex mechanisms of the keyboard instrument. A piano technician may also lift the printed circuit board temporarily out of the way and put it simply back on the dowels without the need for special tools or screws.

Of course, on some keyboard instruments the group of hammers may comprise four or six hammers and corresponding groups of four or six modules 150 are provided. The screws of the two outer hammer flanges are used to secure the saddle 200. Optionally, the saddle 200 may be attached using the screws of any of the hammer flanges 129 associated with the group of hammers, depending on the saddle design.

FIG. 4 also shows a hammer axis 126 of the hammer shank 124. The hammer axis 126 runs along the length of the hammer shank 124 between the pivot point and the hammer head 122. Each module of the group of modules, each light transceiver 140, has a longitudinal axis 128, shown in FIG. 4, running between the centre of the light source 142 and the centre of the photo transistor 144. The longitudinal axis 128 runs along the hammer axis 126 so that the longitudinal axis 128 and the hammer axis 126 align substantially with each other. This arrangement reduces any cross-talk between neighbouring modules on adjacent hammers. The cross-talk is also reduced due to the close proximity of the hammer shank 124 to the light transceiver 140, which causes the view of the photo transistor 144 of the light transceiver 140 to be blocked by the hammer shank 124 as the hammer is raised and so the phototransistor 144 is less likely to receive light from adjacent hammer shanks. The reduction of cross-talk means the electrical signal received by the photo transceiver 144 will be a more accurate indication of the position of the hammer 120 and the processing circuitry 160 will not receive an erroneous electrical signal which may cause timing to start or stop earlier or later than it should resulting in the velocity that is determined being inaccurate.

Additionally or alternatively, neighbouring light transceivers on adjacent hammers may be coupled to different relative points on corresponding hammers. This arrangement reduces cross-talk because the light source 142 on a first hammer will not be in line with the photo transistor 144 on a second hammer, and so the photo transistor 144 of the second hammer is less likely to receive reflected light from the light source 142 of the first hammer because the light will be reflected from a point on the first hammer that is not in line with the photo transistor of the second hammer.

Figure 5:
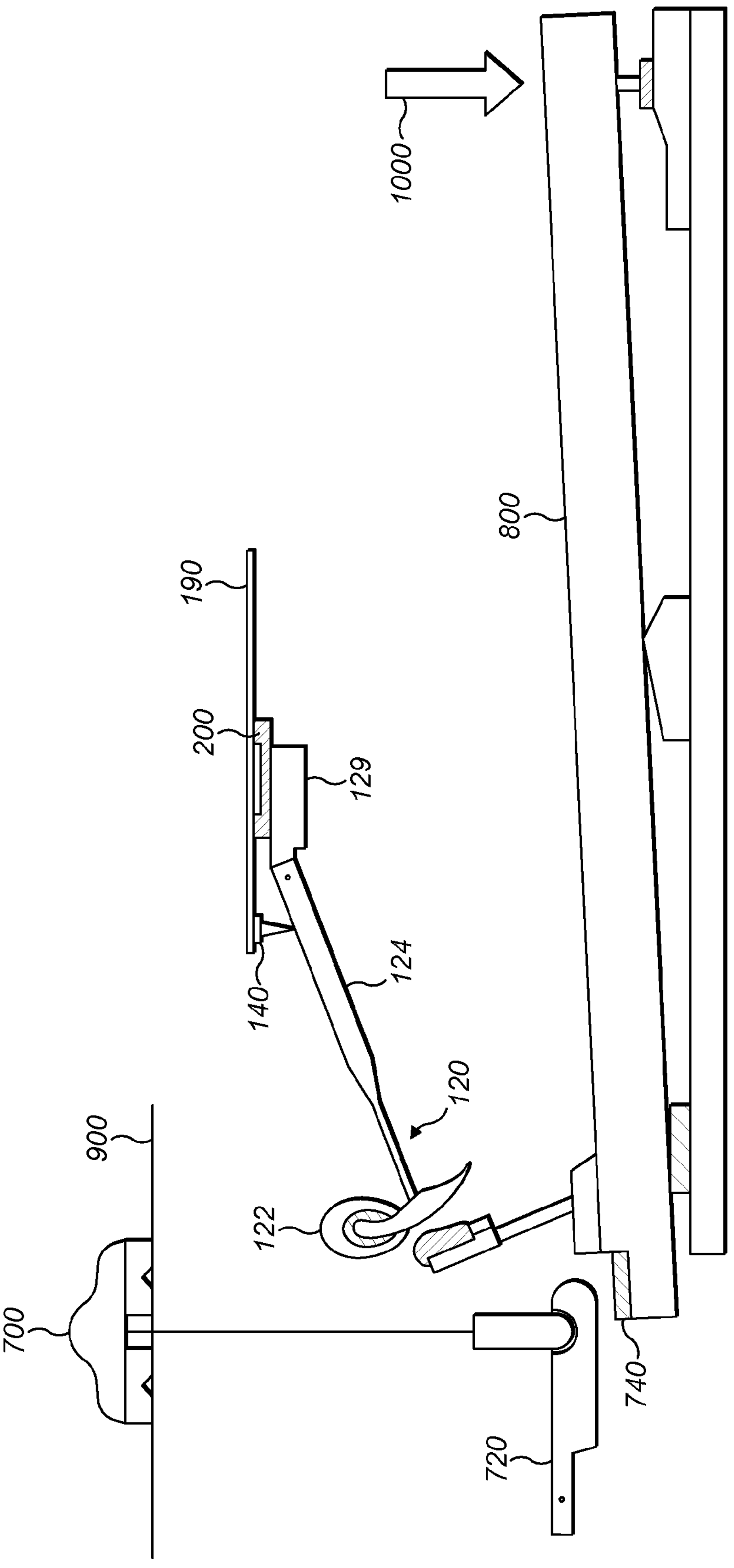
FIG. 5 depicts a side view that shows the system of FIG. 1 installed in a keyboard instrument in one embodiment.

FIG. 5 depicts a side view that shows the system 100 of FIG. 1 installed in a keyboard instrument according to an embodiment. FIG. 5 shows a downward force, represented by arrow 1000, hitting key 800. The movement of the key 800 downwards causes a damper lever cushion 740 to move upwards and exert a force on a damper lever 720. The damper lever 720 is raised up which in turn lifts a damper 700 so that a string 900 is free to vibrate. Simultaneously, the hammer 120 receives an upward force and pivots to move from a rest position towards a strike position on string 900. As the hammer 120 pivots the light transceiver 140 sends and receives a reflected light signal to and from the hammer shank 124. The saddle 200, as described, is positioned to magnetically attach the hammer flange 129 to the printed circuit board 190 upon which the system 100 is mounted.

Figure 6:
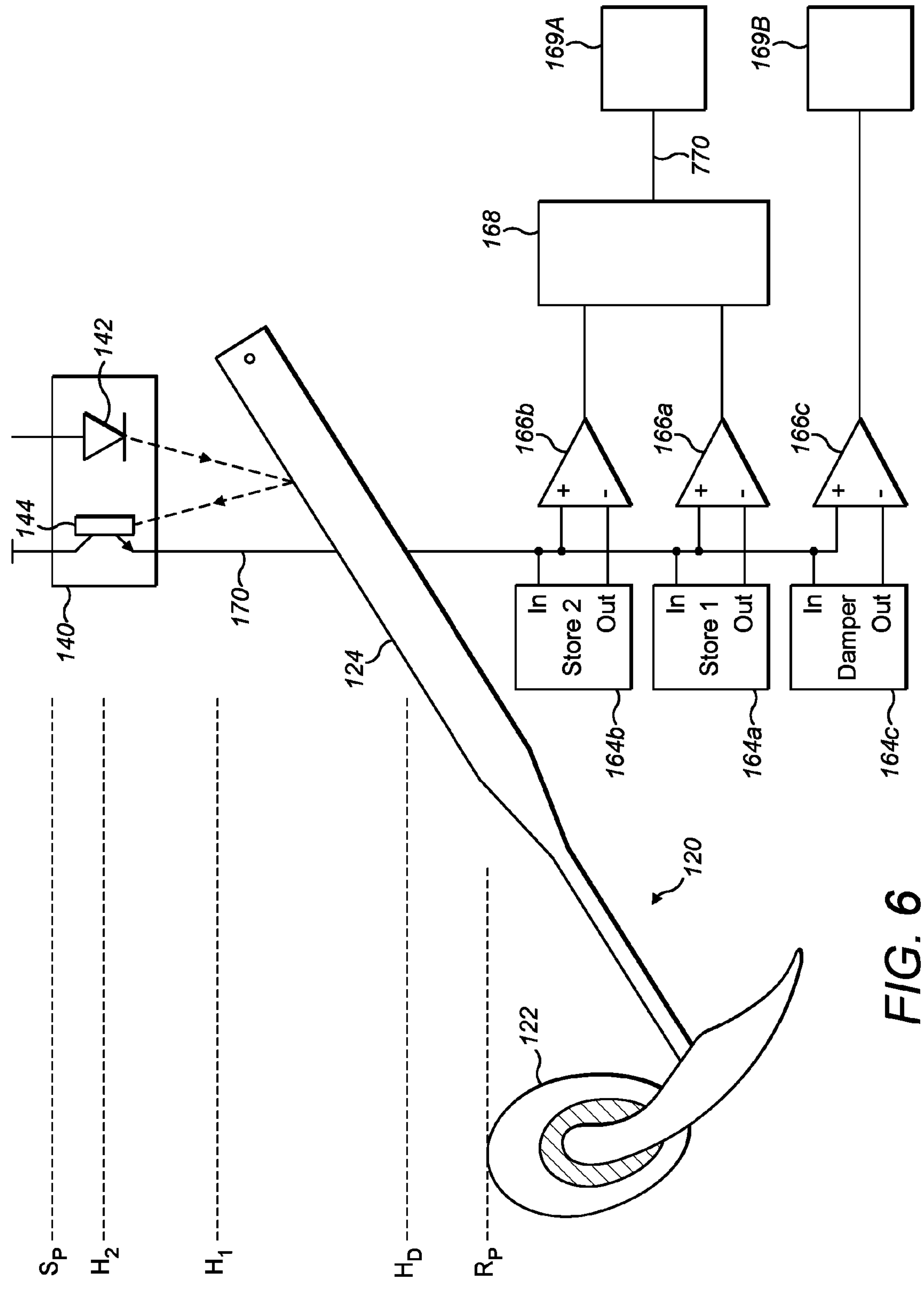
FIG. 6 is a schematic diagram that shows the system of FIG. 1 with a third reference hammer height.

FIG. 6 is a schematic diagram that shows the system 100 of FIG. 1 with a third reference hammer height representative of a position of the damper 700 shown in FIG. 5. The hammer 120 passes through a third reference hammer height, $H_D$, which represents the point at which the damper 700, associated with the hammer 120, is no longer in contact with a string 900 associated with the hammer 120. The processing circuitry 160 further comprises a damper shift register 169B. The damper shift register 169B outputs a signal representative of whether the damper 700 is in contact with the string 900. In more detail, the processing circuitry 160 receives and processes the electrical signal 170 from the light transceiver 140. A sample-and-hold device 164*c* stores the voltage of the third trigger point value, also referred to as a damper trigger point, that is representative of the hammer at a hammer position equal to the third hammer height, $H_D$. A comparator 166*c* compares the electrical signal 170 to the damper trigger point value and sends a signal to the shift register 169B describing the status of the voltage of the electrical signal 170. If the voltage of the electrical signal 170 equals the damper trigger point the comparator 166*c* will send a "1" to the damper shift register 169B. The "1" signifies the time at which the damper associated with the hammer 120 has been lifted from the string of the keyboard instrument. A latch signal 175, at 25.6 kHz, will load the signal sent by the comparator onto the shift register 169B. The damper shift register 169B is coupled to adjacent damper shift registers of neighbouring hammer modules, in the same way as the shift registers 169A are coupled as shown in FIG. 3. The latch signal 175 and the clock signal 775 will also be applied to the damper shift registers to load and clock information about the position of the damper of each respective hammer. The damper shift registers will clock out the data they hold to the central processing unit 180 at a frequency of 2.56 MHz.

The central processing unit 180 uses the data from the damper shift register 169B to determine the time at which a damper of each key of the keyboard instrument was lifted from each string associated with each key, respectively.

Using both shift register 169A and damper shift register 169B the central processing unit 180 can compute the velocity of the hammers, the time of strike of the hammers and the duration of the note played. The shift registers 169A and 169B of each hammer combine to form parallel-in serial-out shift registers of 88 bits for 88 keys and hammers typically found on a grand piano.

Using a third hammer position associated with a third reference hammer height and a damper trigger point provides a reliable way of identifying when a key of the keyboard instrument has been played or released without having to implement an additional system and install the additional system under the keyboard of the instrument. Furthermore, having the ability to detect when the damper has been lifted from a string associated with the hammer allows for the fine details and artistic flair of the performer to be accurately captured, for example if a performer allows the damper to rest back on the string for a brief moment before exerting force to raise the hammer again, the short moment in time that the damper rests on the string will be captured precisely. In more detail, the installation of system 100 will not result in the keys of the keyboard instrument needing to be machined by removing wood from the underside of the keys to make room for a separate key-detect system. Since wood is not being removed from the keyboard instrument, balancing weights do not have to be added to each key to compensate for the loss of wood, this makes the installation process more efficient and easier.

Figure 7:
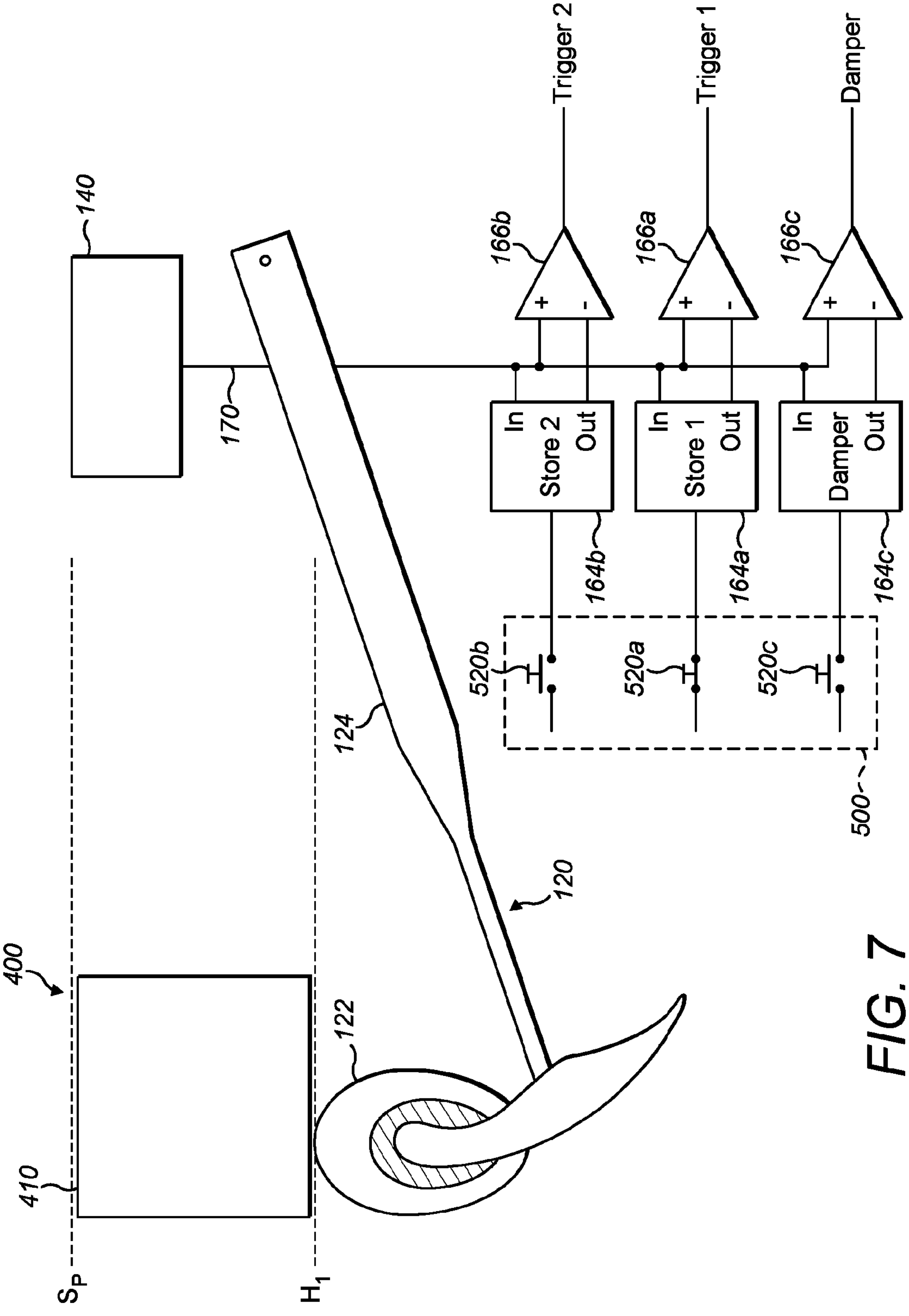
FIG. 7 is a schematic diagram that shows a calibration arrangement 400 for the system of FIG. 1.

FIG. 7 is a schematic diagram that shows a calibration arrangement 400 for the system of FIG. 1. The system 100 is installed on a keyboard instrument, as in FIG. 5, and the calibration arrangement 400 is used to calibrate the system 100. The calibration arrangement comprises a calibration module 500 and a thickness gauge 410. The calibration module 500 is coupled to the processing circuitry 160 of at least one hammer 120 of the keyboard instrument.

The hammer 120 is set to a first hammer height, $H_1$, using a thickness gauge 410. In this instance, the thickness gauge 410 is preferably 5.5 mm thick. A first button 520*a* is activated on the calibration module 500. The calibration module 500 sends an instructing signal to the processing circuitry 160 to store the voltage supplied by the light transceiver 140 as the first trigger point.

The hammer 120 can be set, using a thickness gauge 410, at a second hammer height $H_2$, preferably the thickness gauge 410 is 0.5 mm thick. A second button 520*b* of the calibration module 500 can be activated so that the second voltage received by the processing circuitry 160 can be stored by the processing circuitry 160 as the second trigger point.

In a modified embodiment, shown in FIG. 7, the hammer 120 can be set at a third hammer height, $H_D$, using thickness gauge 410. The third hammer height, $H_D$, is representative of the height at which the damper is lifted from the string. Conventionally, the height at which the damper is lifted from the string is always set at 50% of the distance between the rest position, Rp, of the hammer and the smile strike position, Sp, of the hammer. The distance between the rest and strike positions of the hammer 120 is usually 47 mm, thus, the height at which the damper is lifted from the string is 23.5 mm below the string. Consequently, a thickness gauge 410 that is 23.5 mm thick is used to calibrate the third hammer height, $H_D$. At this point, a third button, 520*c*, of the calibration module 500 can be activated so that the voltage supplied by the light transceiver 140 is stored by the processing circuitry 160 as the third trigger point.

This procedure is repeated for the remaining hammers of the keyboard instrument.

The calibration process accounts for the reflective properties of the hammer shank 124 of each hammer and so no special reflective paints or labels are necessary, making the process more cost effective and the system 100 easier to install.

Alternatively, the keyframe of the keyboard instrument may be removed from the keyboard instrument and set on a level surface together with a string height assembly jig, which puts an adjustable bar at precisely the height of the strings relative to the key-bed. The hammer assembly, the system 100 and the string height assembly jig may be maneuvered so that the hammers can be manually raised to touch the artificial string line. The thickness gauge 410 may be inserted in between the hammer 120 and the artificial string line. In much the same way as described above, the hammer 120 may be set to a first hammer height, $H_1$, using the thickness gauge 410. The first button 520*a* of the calibration module 500 connected to the processing circuitry 160 may then be pressed so that the voltage received by the processing circuitry 160 is stored as the first trigger point. This process can be repeated for each key of the keyboard instrument, and also for the second and third trigger points associated with second and third hammer positions that are represented by hammer heights $H_2$ and $H_D$, respectively.

FIG. 7 also shows calibration circuitry. The calibration module 500 is coupled to the processing circuitry 160. The calibration buttons, 520*a-c*, are each connected to corresponding sample-and-hold devices, 164*a-c*. When the hammer 120 is set to hammer height $H_1$, as shown in FIG. 7, the phototransistor 144 sends an electrical signal 170 representative of $H_1$ to the sample-and-hold devices 164. Calibration button 520*a* is pressed which sends an output signal to sample-and-hold device 164*a* instructing sample-and-hold device 164*a* to store the voltage of the received electrical signal 170 as a first trigger point.

When the hammer is set to hammer height $H_2$ the phototransistor 144 sends an electrical signal 170 representative of $H_2$ to the sample-and-hold devices 164. Calibration button 520*b* is pressed which sends an output signal to sample-and-hold device 164*b* instructing sample-and-hold device 164*b* to store the voltage of the received electrical signal 170 as a second trigger point.

A third trigger point, the damper trigger point, representative of when the damper is lifted from the string, is stored by setting the hammer to height $H_D$ and pressing calibration button 520*c* so that the voltage of the electrical signal supplied to the processing circuitry 160 is stored as the damper trigger point.

As shown in FIG. 7, it is the hammer head 122 of hammer 120 that comes into contact with the thickness gauge 410 to calibrate the trigger point values. Using the hammer head 122 to calibrate has the advantage of creating trigger point values that are less dependent on variables that may change between different keyboard instruments. Although, for example, the length of the hammer shank 124 and the position of the light transceiver 140 relative to the hammer shank 124 may change, the point of the hammer 120 (i.e. the hammer head 122) which reaches the hammer heights associated with the trigger points is consistent in all keyboard instruments. Thus, using the hammer head 122 position for calibration provides a reliable and accurate benchmark upon which to base associated trigger points. In this way, the velocity determined is an accurate representation of the original velocity of the hammer head 122 when the music was originally performed.

Figure 8:
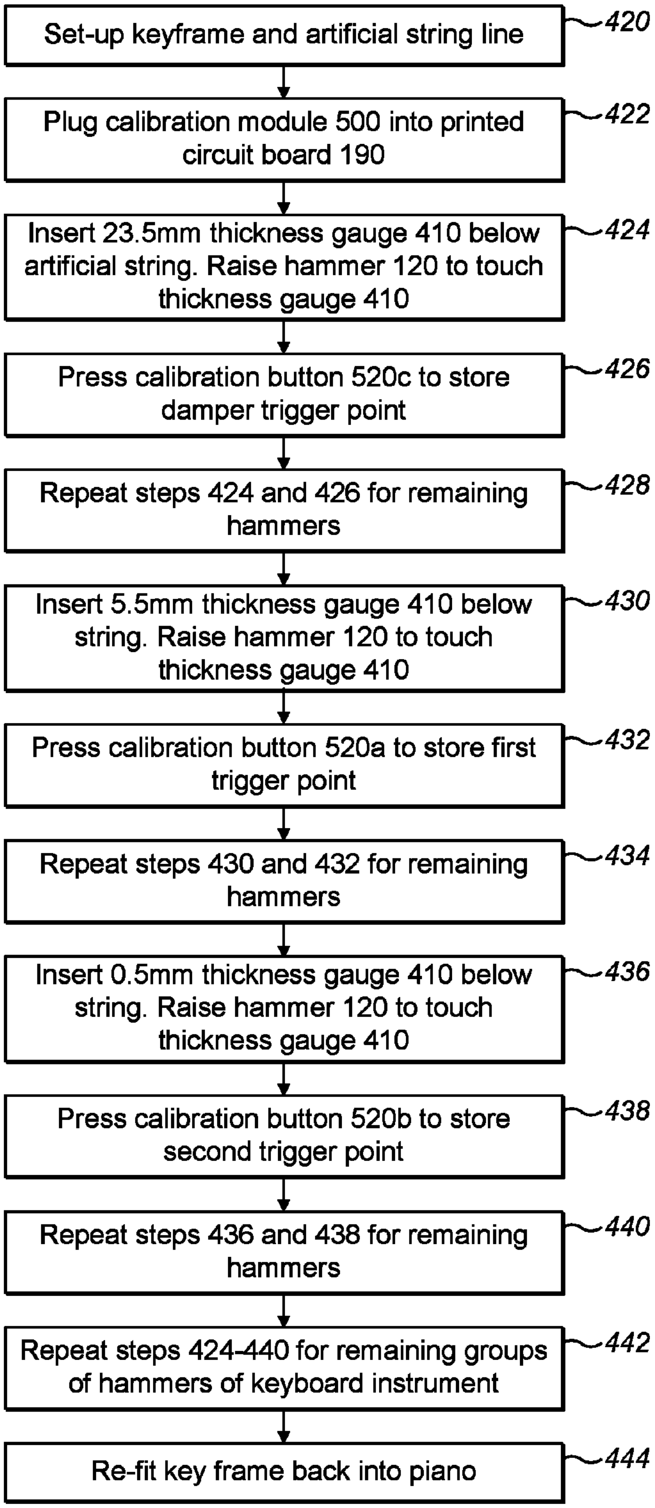
FIG. 8 is a flowchart that shows a method of calibration using the calibration arrangement of FIG. 7.

FIG. 8 is a flowchart that shows a possible calibration method using the calibration arrangement 400 with a string-height assembly jig. At step 420, the keyframe of the musical piano is removed and set on a level surface along with a string height assembly jig which causes an adjustable bar to be set at precisely the height of the strings relative to the key-bed. The hammer action assembly with system 100 installed and the string height assembly jig are maneuvered so the hammer can be manually raised to touch the adjustable bar (artificial string line).

At step 422, the calibration module 500 is connected to the printed circuit board associated with a group of modules 150.

At step 424, the thickness gauge 410 of 23.5 mm thickness is inserted below the artificial string. A hammer 120 associated with a module of the group of modules 150 is manually raised so that the hammer head 122 touches the thickness gauge 410.

At step 426, the calibration button 520*a* is pressed and the voltage of signal 170 from the light transceiver 140 is stored in sample-and-hold device 164*c*.

At step 428, the procedure of steps 424 and 426 is repeated for the remaining hammers associated with the group of modules 150.

At step 430, a thickness gauge 410 of thickness 5.5 mm is inserted below the artificial string and a hammer 120 associated with the group of modules 150 is manually raised so that the hammer head 122 of the hammer 120 touches the thickness gauge 410.

At step 432, calibration button 520*a* is pressed to store the voltage of the electrical signal 170 as the first trigger point.

At step 434, the process of steps 430 and 432 are repeated for the remaining hammers associated with the group of modules 150.

At step 436, a thickness gauge 410 of thickness 0.5 is inserted below the artificial string and a hammer 120 associated with the group of modules 150 is manually raised so that the hammer head 122 of hammer 120 touches the thickness gauge 410.

At step 438, calibration button 520*b* is pressed to store the voltage of the electrical signal 170 as the second trigger point.

At step 440, the process of steps 436 and 438 are repeated for each hammer 120 associated with the group of modules 150.

At step 442, steps 424 to 440 are repeated for the remaining groups of modules of the keyboard instrument.

At step 444, the key frame is fitted back into the keyboard instrument.

When the first and second trigger points are being calibrated, the hammer head 122 is raised substantially above the third reference hammer height associated with the damper trigger point. This results in the comparator 166*c* associated with the damper trigger point signifying which hammer is currently being raised.

The combined transmission/reception gain of the chosen devices exhibits very well-controlled thermal sensitivity, changing by less than 0.5% over a temperature range from 10° to 50° C. Any small effect that this may have on the measured IHV would tend to cancel out because the same opto device is used for both IHV trigger points.

The system 100 and the calibration arrangement 400 and the calibration method allow the total original musical performance to be digitally captured by recording the following keyboard parameters:

The detection of which key is pressed sufficiently to lift the damper off the string.

The identity and velocity measurement of the hammer before it strikes the string.

The instant in time the hammer strikes the string, defining the note-on event.

The instant in time when the pianist releases the key; the damper is no longer lifted, so the sound is quenched, defining the note-off event.

Although the invention has been described above with reference to one or more preferred embodiments, it will be appreciated that various changes or modifications may be made without departing from the scope of the invention as defined in the appended claims.

The invention claimed is:

1. A system for determining a velocity of a hammer of a keyboard instrument, the system comprising:

a light transceiver; and processing circuitry;

wherein the light transceiver is configured to:

transmit a light signal to a hammer;

receive a reflected light signal from the hammer indicative of a position of the hammer as the hammer moves between a rest position and a strike position; and send an electrical signal to the processing circuitry, wherein the electrical signal is based on the reflected light signal received from the hammer;

wherein the processing circuitry is configured to receive and process the electrical signal, comprising:

determining a time interval between the electrical signal passing through a first trigger point representative of a first hammer position and a second trigger point representative of a second hammer position; and determining a velocity of the hammer based on the time interval, wherein i) the first hammer position corresponds to a first hammer height above the rest position, or ii) the second hammer position corresponds to a second hammer height below the strike position, the second hammer height being in close proximity to the strike position.

2. The system of claim 1, wherein the second hammer height is within 1 mm of the strike position.

3. The system of claim 1, wherein the light signal includes one or both of a visible light signal and an infra-red light signal.

4. The system of claim 1, wherein the first and second trigger points are voltages stored by the processing circuitry.

5. The system of claim 1, wherein the processing circuitry is configured to perform one or both of: i) store the first trigger point on a first sample-and-hold device, and ii) store the second trigger point on a second sample-and-hold device.

6. The system of claim 1, wherein the first trigger point represents a first hammer position at a first predetermined hammer height and wherein the second trigger point represents a second hammer position at a second predetermined hammer height.

7. The system of claim 1, wherein the processing circuitry is configured to store a third trigger point and to receive and process the electrical signal when the electrical signal passes through the third trigger point, wherein the third trigger point is representative of a third hammer position at a third predetermined hammer height, wherein the third predetermined hammer height represents a time at which a damper of the keyboard instrument is no longer in contact with a string associated with the hammer.

8. The system of claim 1, wherein the light transceiver comprises an infra-red light source and a phototransistor.

9. The system of claim 1, wherein the light transceiver is configured to:

transmit the light signal to a hammer shank of the hammer; and receive the reflected light signal from the hammer shank of the hammer.

10. The system of claim 1, wherein the processing circuitry comprises a logic block configured to generate a logic signal, the logic signal being calculated from the electrical signal received from the light transceiver and being representative of the time interval, wherein the logic signal has a first pulse representative of a first time at which the electrical signal passes through the first trigger point, and a second pulse representative of a second time at which the electrical signal passes through the second trigger point.

11. The system of claim 10, wherein respective leading edges of the first pulse and the second pulse in the logic signal represent the first and second times at which the electrical signal passes through the first and second trigger points, respectively, wherein the second pulse of the logic signal is configured to be sustained until the electrical signal passes back through the second trigger point towards the first trigger point.

12. The system of claim 10, further comprising a central processing unit and a clock signal having clock pulses, wherein the central processing unit is arranged to count a number of clock pulses that occur between the first time at which the electrical signal passes through the first trigger point and the second time at which the electrical signal passes through the second trigger point, wherein the number of clock pulses represents an inverse hammer velocity (IHV).

13. The system of claim 1, wherein the processing circuitry comprises a shift register configured to output a signal representative of the electrical signal.

14. The system of claim 1, wherein the light transceiver and the processing circuitry together form a hammer module, wherein the system comprises a plurality of hammer modules arranged to form a group module, wherein each hammer module in the group module is physically connected to at least one adjacent hammer module.

15. The system of claim 14, wherein the group module is mounted to a printed circuit board, and the printed circuit board is configured to magnetically couple to a corresponding group of hammers.

16. The system of claim 14, wherein light transceivers of adjacent hammer modules are configured to be positioned at different relative points along lengths of adjacent hammers corresponding to the adjacent hammer modules.

17. The system of claim 13, wherein the light transceiver and the processing circuitry together form a hammer module, wherein the system comprises a plurality of hammer modules arranged to form a group module, wherein each hammer module in the group module is physically connected to at least one adjacent hammer module.

18. The system of claim 17, wherein the shift registers of all hammer modules are arranged together to form a parallel-in serial-out shift register arranged to be clocked and latches by a central processing unit to move information representing the electrical signal for each hammer to the central processing unit.

19. The system of claim 1, wherein the first hammer position and the second hammer position are separated by a distance of 3-7 mm.

20. The system of claim 19, wherein the distance between the first hammer position and the second hammer position is chosen such that a difference between a velocity of the hammer at the first hammer position and a velocity of the hammer at the second hammer position is minimized.

21. The system of claim 19, wherein the second hammer height is 0.1-1.0 mm below the strike position in which the hammer makes contact with a string associated with the hammer.

22. The system of claim 21, wherein the determined velocity of the hammer is representative of a terminal velocity of the hammer as the hammer makes contact with the string.

23. The system of claim 21, wherein the first hammer position and the second hammer position are chosen to minimize cross-talk between the light transceiver and adjacent light transceivers that correspond to adjacent hammers.

24. The system of claim 23, wherein a view of a phototransistor of the light transceiver becomes increasingly blocked by the hammer as the hammer approaches the second hammer position such that light emitted by the adjacent light transceivers is progressively obstructed from being received by the phototransistor as the hammer approaches the second hammer position.

25. The system of claim 15, wherein the corresponding group of hammers comprises a saddle magnetically attractive to the printed circuit board and configured to magnetically couple thereto.

26. The system of claim 25, wherein the printed circuit board includes a pair of apertures that are configured to engage with a corresponding pair of alignment members of the saddle when the printed circuit board is magnetically coupled to the saddle.

27. The system of claim 26, wherein the apertures and the alignment members are positioned such that a longitudinal axis of the light transceiver of each hammer module is aligned with a hammer axis of a corresponding hammer of the group when the apertures are engaged with the alignment members.

28. The system of claim 27, wherein the longitudinal axis of each light transceiver runs between a center of a light source and a center of a photo transistor to minimize cross-talk between neighboring hammer modules.

29. The system of claim 26, wherein the alignment members comprise heads of screws that affix the saddle to flanges of the group of hammers.

30. A system for determining a velocity of a hammer of a keyboard instrument, the system comprising:
a light transceiver; and
processing circuitry;
wherein the light transceiver is configured to:
transmit a light signal to a hammer;
receive a reflected light signal from the hammer indicative of a position of the hammer as the hammer moves between a rest position and a strike position; and
send an electrical signal to the processing circuitry, wherein the electrical signal is based on the reflected light signal received from the hammer;
wherein the processing circuitry is configured to receive and process the electrical signal, comprising:
determining a time interval between the electrical signal passing through a first trigger point representative of a first hammer position and a second trigger point representative of a second hammer position; and
determining a strike velocity of the hammer based on the time interval, wherein the strike velocity is representative of a terminal velocity of the hammer as the hammer makes contact with a string associated with the hammer.

31. The system of claim 30, wherein a velocity of the hammer at the first hammer position is approximately equal to a velocity of the hammer at the second hammer position.

32. The system of claim 30, wherein the second hammer position corresponds to a hammer height below the strike position and within 1 mm of the strike position.

33. The system of claim 32, wherein the hammer height is 0.5 mm below the strike position.

34. A system for determining a velocity of a hammer of a keyboard instrument, the system comprising:
a light transceiver; and
processing circuitry;
wherein the light transceiver is configured to:
transmit a light signal to a hammer;
receive a reflected light signal from the hammer indicative of a position of the hammer as the hammer moves between a rest position and a strike position; and
send an electrical signal to the processing circuitry, wherein the electrical signal is based on the reflected light signal received from the hammer;
wherein the processing circuitry is configured to receive and process the electrical signal, comprising:
determining a time interval between the electrical signal passing through a first trigger point representative of a first hammer position and a second trigger point representative of a second hammer position; and
determining a velocity of the hammer based on the time interval,
wherein the first hammer position corresponds to a first hammer height above the rest position, the second hammer position corresponds to a second hammer height below the strike position, and the first hammer position and the second hammer position are separated by a distance of 3-7 mm.

35. The system of claim 34, wherein a velocity of the hammer at the first hammer height is approximately equal to a velocity of the hammer at the second hammer height.

36. The system of claim 34, wherein the second hammer height is within 1 mm of the strike position.

37. The system of claim 36, wherein the second hammer height is 0.5 mm below the strike position.

38. A system for determining a velocity of a hammer of a keyboard instrument, the system comprising:
a group module comprising a plurality of adjacent interconnected hammer modules, each hammer module comprising:
a light transceiver; and
processing circuitry;
wherein the light transceiver is configured to:
transmit a light signal to a hammer;
receive a reflected light signal from the hammer indicative of a position of the hammer as the hammer moves between a rest position and a strike position; and
send an electrical signal to the processing circuitry, wherein the electrical signal is based on the reflected light signal received from the hammer;
wherein the processing circuitry is configured to receive and process the electrical signal, comprising:
determining a time interval between the electrical signal passing through a first trigger point representative of a first hammer position and a second trigger point representative of a second hammer position; and
determining a velocity of the hammer based on the time interval,
wherein light transceivers of adjacent hammer modules are configured to be positioned at different relative points along lengths of adjacent hammers corresponding to the adjacent hammer modules.

39. The system of claim 38, wherein the first hammer position and the second hammer position are chosen to minimize cross-talk between adjacent light transceivers that correspond to adjacent hammers.

40. The system of claim 39, wherein a view of a phototransistor of one of the light transceivers becomes increasingly blocked by the corresponding hammer as the corresponding hammer approaches the second hammer position such that light emitted by adjacent light transceivers is progressively obstructed from being received by the phototransistor as the corresponding hammer approaches the second hammer position.

41. The system of claim 38, wherein the group module is mounted to a printed circuit board, and the printed circuit board is configured to magnetically couple to a corresponding group of hammers.

42. The system of claim 41, wherein the corresponding group of hammers comprises a saddle magnetically attractive to the printed circuit board and configured to magnetically couple thereto.

43. The system of claim 42, wherein the printed circuit board includes a pair of apertures that are configured to engage with a corresponding pair of alignment members of the saddle when the printed circuit board is magnetically coupled to the saddle.

44. The system of claim 43, wherein the apertures and the alignment members are positioned such that a longitudinal axis of the light transceiver of each hammer module is aligned with a hammer axis of a corresponding hammer of the group when the apertures are engaged with the alignment members.

45. The system of claim 44, wherein the longitudinal axis of each light transceiver runs between a center of a light source and a center of a photo transistor to minimize cross-talk between neighboring hammer modules.

46. The system of claim 43, wherein the alignment members comprise heads of screws that affix the saddle to flanges of the group of hammers.

47. The system of claim 43, wherein the alignment members comprise dowels.

48. A method for determining a velocity of a hammer of a keyboard instrument, the method comprising:

transmitting a light signal to a hammer;

receiving a reflected light signal from the hammer indicative of a position of the hammer as the hammer moves between a rest position and a strike position;

generating an electrical signal based on the reflected light signal received from the hammer;

determining a time interval between the electrical signal passing through a first trigger point representative of a first hammer position and a second trigger point representative of a second hammer position; and determining a velocity of the hammer based on the time interval, wherein the first hammer position corresponds to a first hammer height above the rest position, and the second hammer position corresponds to a second hammer height below the strike position, the second hammer height being close to the strike position.

49. The method of claim 48, further comprising:

setting the hammer to the first hammer height;

storing the first trigger point on a first sample-and-hold device;

setting the hammer to the second hammer height; and storing the second trigger point on a second sample-and-hold device.

50. The method of claim 49, wherein the first trigger point and the second trigger point are voltages supplied by a light transceiver that transmits the light signal and receives the reflected light signal.

51. The method of claim 49, further comprising:

setting the hammer to a third hammer height; and storing a third trigger point on a third sample-and-hold device, wherein the third hammer height represents a time at which a damper of the keyboard instrument is no longer in contact with a string associated with the hammer.

52. A system for determining a velocity of a hammer of a keyboard instrument, the system comprising:

a transceiver; and processing circuitry;

wherein the transceiver is configured to:

transmit a signal to a hammer;

receive a reflected signal from the hammer indicative of a position of the hammer as the hammer moves between a rest position and a strike position; and send an electrical signal to the processing circuitry, wherein the electrical signal is based on the reflected signal received from the hammer;

wherein the processing circuitry is configured to receive and process the electrical signal, comprising:

determining a time interval between the electrical signal passing through a first trigger point representative of a first hammer position and a second trigger point representative of a second hammer position; and determining a velocity of the hammer based on the time interval, wherein i) the first hammer position corresponds to a first hammer height above the rest position, or ii) the second hammer position corresponds to a second hammer height below the strike position, the second hammer height being within 1 mm of the strike position.

53. The system of claim 52, wherein the signal is an electromagnetic signal.

* * * * *